United States Patent [19]

Holloway et al.

[11] 4,132,272
[45] Jan. 2, 1979

[54] TRACTOR HITCH POSITION CONTROL SYSTEM

[75] Inventors: Gale A. Holloway, Joliet; Wayne W. Lark, Westmont; Phillip M. McLaughlin, Downers Grove; Robert M. Mortonson, Park Ridge, all of Ill.

[73] Assignee: International Harvester Company, Chicago, Ill.

[21] Appl. No.: 811,517

[22] Filed: Jun. 30, 1977

[51] Int. Cl.² ............................................. A01B 63/10
[52] U.S. Cl. .......................................... 172/2; 172/9
[58] Field of Search ............... 37/DIG. 1, 20; 91/361, 91/363 R, 363 A; 172/2, 4, 4.5, 6–9, 11; 214/762; 404/84

[56] References Cited

U.S. PATENT DOCUMENTS

| | | | |
|---|---|---|---|
| 3,125,856 | 3/1964 | Branson et al. | 91/363 R |
| 3,516,498 | 6/1970 | Schowalter | 172/9 |
| 3,808,948 | 5/1974 | Glaze | 91/363 A |
| 3,955,783 | 5/1976 | Glaze et al. | 91/363 A X |
| 4,053,018 | 10/1977 | Takeda | 172/7 X |

FOREIGN PATENT DOCUMENTS

| | | | |
|---|---|---|---|
| 2431912 | 1/1976 | Fed. Rep. of Germany | 91/363 A |
| 809758 | 3/1959 | United Kingdom | 91/363 R |

*Primary Examiner*—Vance Y. Hum

*Attorney, Agent, or Firm*—Douglas W. Rudy; Ronald C. Kamp; F. David AuBuchon

[57] ABSTRACT

A control system is provided for a hydraulically operated tractor hitch assembly including a rockshaft operated by a main cylinder which is controlled through a spool valve operated by a pilot cylinder which is controlled, in turn, through a solenoid operated pilot valve. The pilot valve is selectively controlled from first and second detector circuits through a gating circuit which is controlled by a third detector circuit which responds to a first error signal developed by comparing a command signal which corresponds to a rockshaft target position and a first feedback signal which corresponds to the actual rockshaft position and which is generated by a potentiometer connected to the rockshaft. The first detector circuit is operative when the first error signal is of relatively high magnitude and responds to a second error signal developed by comparing the first error signal with a feedback signal derived through a signal modifying circuit from the potentiometer connected to the spool valve, with the signal modifying circuit being operative to compensate for a dead zone of the spool valve and with the operation being such that the rockshaft is rotated to a position within a zero target range without under-shoot, over-shoot or oscillation. The second detector circuit is operative when the first error signal is of low magnitude and responds directly to the second feedback signal to center the spool valve.

5 Claims, 2 Drawing Figures

TRACTOR HITCH POSITION CONTROL SYSTEM

This invention relates to a control system for a hydraulically operated tractor hitch assembly and more particularly to an electrically controlled and highly effective system with which the hitch assembly is accurately and smoothly operated to a desired target condition without oscillatory or hunting action. At the same time, the system is usable with hydraulic systems which have valves and other components of standard types and is otherwise economically manufacturable while being readily installed.

BACKGROUND OF THE INVENTION

Prior to this invention, an electrically operated control system has been used for a hydraulically operated tractor hitch assembly of the type including a rockshaft operated by a main cylinder which is controlled through a main valve operated by a pilot cylinder which is controlled, in turn, through a solenoid operated pilot valve. In that system, the pilot valve is connected to the output of an amplifier circuit responsive to an error signal developed as a function of a comparison between the position of a manually operable control and an operational condition of the hitch assembly such as its vertical position. The amplifier circuit is also responsive to a feedback signal developed in response to movement of a spool or control element of the main valve and applied in opposition to the error signal.

With that system, disadvantages of manual operation of the main valve are overcome and highly satisfactory results can be achieved. However, there are problems in obtaining a fast response to movements of the manually operable control and in obtaining accurate control without running into problems in connection with oscillations and instabilities in the operation of the system.

It is also noted that various other types of electrically controlled servo systems have been used in many applications but for a number of reasons, such systems have not been entirely suitable for control of a tractor hitch assembly.

SUMMARY OF THE INVENTION

This invention was evolved with the general object of overcoming the disadvantages of prior art systems and of providing a control system for a tractor hitch assembly which is highly stable and reliable and with which the position of the hitch assembly can be smoothly and accurately controlled.

Another object of the invention is to provide a system usable with valves and other components of standard highly reliable types, with the system being otherwise economically manufacturable and highly reliable while being readily installed.

The tractor hitch position control system of this invention is operable to control a hitch assembly which includes a rockshaft rotated by a main cylinder with fluid flow thereto being controlled through a main control valve operated by a pilot cylinder. The pilot cylinder, in turn, is controlled through an electrically operated pilot valve which is connectable to the output of an error detector circuit responsive to a comparator output signal developed from three signals. The first signal is a command signal which corresponds to a desired or target condition of the hitch assembly and which may be developed by a potentiometer having a movable contact mechanically coupled to a control lever. The second is a first feedback signal which corresponds in actual operational condition of the hitch assembly and which, for example, may be angular position of the rockshaft, with the signal being developed by a potentiometer connected to the rockshaft. The third is a second feedback signal which corresponds to the position of a control element of the main valve which is preferably a spool valve with the second feedback signal being developed from a potentiometer mechanically coupled to the spool member of the valve.

In accordance with an important feature, the error detector means in conjunction with the pilot valve is operative to provide threshold values of operation such that a predetermined difference in each direction between the amplitude of a comparator output signal and a reference potential is required for operation of the pilot valve in a corresponding direction to initiate flow to the pilot cylinder.

With this arrangement, the system can smoothly operate in response to a change in the command signal, indicating a new target condition, to cause the rockshaft to so move as to produce the new target condition without oscillatory or hunting actions.

The second feedback signal is applied in a direction to cause movement of the main valve control element in a direction which is the reverse of the direction in which it is initially moved proportionally in response to a change in the command signal. As a result, when the condition of the assembly approaches the target condition, flow to the main cylinder is reduced to be cut off after the assembly comes within a narrow target condition range and before it is moved therebeyond.

The interrelationship between the amplitudes of the three signals applied to the detector circuit and the relationship of such signals to the characteristics of the hitch assembly and its components, including the main control valve, is important in obtaining a high degree of accuracy, i.e. a very narrow target condition range, while at the same time obtaining smooth operation without oscillatory or hunting actions. In the system of this invention, amplifiers are used in applying the signals which have amplification factors predetermined in accordance with the characteristics of the valves and cylinders of the hydraulic system and the conditions of operation thereof with respect to applied fluid pressures and loads. Also, the threshold value of operation of the detector circuit is predetermined to obtain maximum accuracy commensurate with smooth and reliable operation.

An important and specific feature relates to the provision of a signal modifying circuit in applying the second feedback signal, the signal modifying circuit having characteristics corresponding to the characteristics of the main control valve. Preferably, the main control valve is a standard type of valve such as a spool valve which is highly reliable in operation while being economically manufacturable. Such a valve has what is referred to as a "dead zone" requiring a certain distance of movement of the spool member away from the centered or neutral position before flow commences in either direction. The signal modifying circuit has, in effect, a corresponding dead zone, transmitting the second feedback signal only in response to movements of the main valve control element in either direction beyond the dead zone.

Another important specific feature relates to the provision of means for centering the main valve after the rockshaft is moved to a new target position, to thus place the main valve in a condition in which it and the other components of the system can properly respond to a new change of the command signal in either direction. Preferably and in accordance with specific features, a second error detector circuit is provided having an input to which the second feedback signal is directly applied. A gating circuit is provided for selectively applying the output of either the first detector circuit or the second detector circuit to the pilot valve, the gating circuit being controlled from a third error detector circuit which is responsive to an error signal developed by comparing the command signal and the first feedback signal. When such error signal has a magnitude above a certain threshold value, indicating that the rockshaft should be moved to a new angular position, the output of the first detector circuit is applied through the gating circuit to the pilot valve. When, however, the error is signalled through the magnitude less than the threshold value, indicating that the rockshaft is at the desired or target angular position, the second detector circuit is operative to cause centering of the main control valve.

This invention contemplates other objects, features and advantages which will become more fully apparent from the following detailed description taken in conjunction with the accompanying drawings.

DESCRIPTION OF A PREFERRED EMBODIMENT

Figure 1:
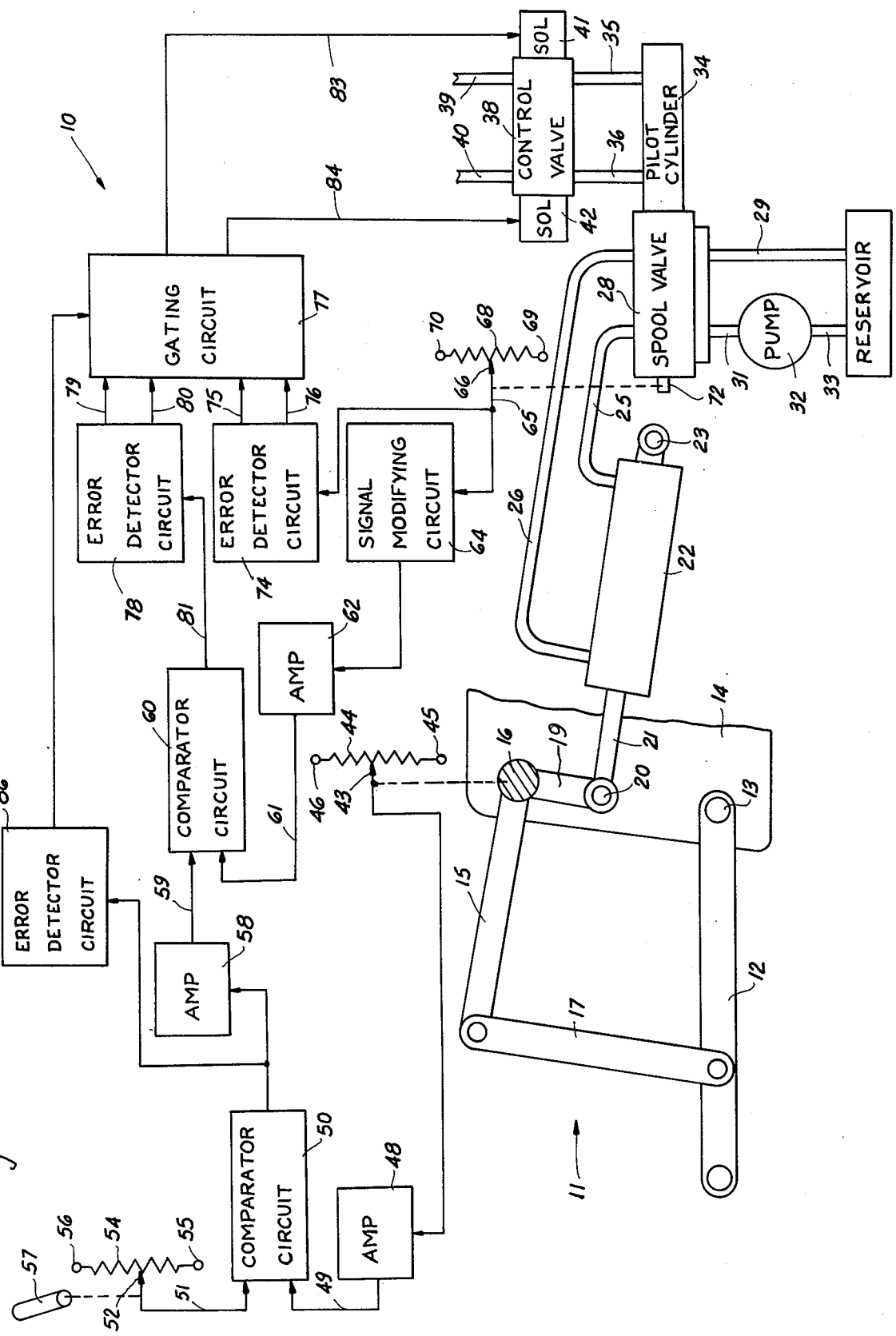
FIG. 1 is a schematic diagram of a tractor hitch position control system according to the invention, shown connected to a hydraulically controlled hitch assembly which is also illustrated diagrammatically.

Reference numeral 10 generally designates a tractor hitch position control system constructed in accordance with the principles of this invention. The system 10 is operable to control a hitch 11 including a lower arm 12 having a rearward end adapted to be secured to a plow or other implement and having a forward end secured to a shaft 13 supported and journalled from a rearward end portion 14 of a tractor. The hitch assembly further includes an upper arm 15 having a forward end secured to a rockshaft also supported and journalled from the rearward end of portion 14 of the tractor. The rearward end of the upper arm 15 is connected through a link 17 to the lower arm 12 at a point spaced forwardly from the rearward end of the lower arm 12. It will be understood that the illustrated linkage is mounted on one side of the tractor and a corresponding linkage is supported on the opposite side of the tractor, including an upper arm secured to the rockshaft 16. An actuating arm 19 secured to the rockshaft 16 is connected through a pin 20 to an end of a piston rod 21 the opposite end of which is secured to a piston movable within a hydraulic cylinder 22, cylinder 22 being connected to the tractor frame, as through a pin 23.

The hydraulic cylinder 22 is coupled through conduits 25 and 26 to a main control valve 28 which is coupled through a conduit 29 to a reservoir 30 and also through a conduit 31 to the outlet of a pump 32 having an inlet coupled through a conduit 33 to the reservoir.

The main control valve 28 is preferably a spool valve including a reciprocable spool member which is connected to a pilot piston movable within a pilot cylinder 34 which is connected through conduits 35 and 36 to a control valve 38 connected to fluid supply and return lines 39 and 40. The control valve 38 which may, for example, include a pair of poppet valve units is operable by a pair of solenoids 41 and 42.

The operation may be such that with both solenoids 41 and 42 deenergized, the supply line 39 is connected to both lines 35 and 36 so that fluid under pressure is applied to both ends of the pilot cylinder and the pilot piston is disposed in a centered position. When solenoid 41 is energized, fluid flow from the supply line to conduit 35 is cut off while conduit 35 is connected to the return line 40 while fluid under pressure is applied from the supply line 39 to the conduit 36, the spool of the valve 28 being then moved in one direction to allow flow of fluid from the outlet of pump 32 through conduit 31, spool valve 28 and conduit 25 to the cylinder 22 to move the piston rod 21 forwardly and to rotate the rockshaft 16 in a clockwise direction to raise the hitch assembly 11, return fluid from the cylinder 22 being allowed to flow through conduit 26 and conduit 29 to the reservoir 30.

As diagrammatically illustrated, the rockshaft 16 is coupled mechanically to a movable contact 43 of a potentiometer 44 having end terminals 45 and 46 which are connected to a voltage supply source to be at different voltage reference potentials, the signal being thus developed at the movable contact 43 which corresponds to the angular position of the rockshaft 16.

The signal developed at the contact 43 is applied to one input of a DC amplifier circuit 48 the output of which is connected through a line 49 to one input of a comparator circuit 50. A second input of comparator circuit 50 is connected through a line 51 to a movable contact 52 of a potentiometer 54 having end terminals 55 and 56 connected to a voltage supply to be at different reference voltage potentials. Movable contact 52, as diagrammatically illustrated may be mechanically coupled to a manually operable lever 57.

In general, the operation of the system 10 is such that the angular position of the rockshaft 16 corresponds to the angular position of the control lever 57. When the lever 57 is rotated in one direction, the system responds by rotating the rockshaft 16 in a corresponding direction to change an error signal at the output of the comparator circuit 50 toward a predetermined reference value. The error signal at the output of the comparator circuit 50 is applied to the input of a DC amplifier circuit 58 having an output connected through a line 59 to one input of a second comparator circuit 60 which has a second input connected through a line 61 to the output of a DC amplifier circuit 62. The input of the amplifier circuit 62 is connected through a line 63 to the output of a signal modifying circuit 64 which has an input connected through a line 65 to a movable contact 66 of a potentiometer 68 having end terminals 69 and 70 which are connected to a voltage source to be at different voltage reference potentials. As diagrammatically indicated, a movable contact 66 is mechanically coupled to a projecting rod portion 72 of the spool valve 28, the rod portion 72 being connected to the spool member of the valve 28. The movable contact 66 is also connected electrically through the line 65 to the input of an error detector circuit 74 having a pair of outputs connected through lines 75 and 76 to a gating circuit 77. Another error detector circuit 78 is provided having outputs connected through lines 79 and 80 to the gating circuit 77 and having an input connected through line 81 to the output of the comparator circuit 60. Gating circuit 77 has outputs connected through lines 83 and 84 to the raise and lower solenoids 41 and 42 and is controlled through a line 85 connected to the output of another error detector circuit 86 having an input connected through a line 87 to the output of the comparator circuit 50.

When the system is in a quiescent state in which the control lever 57 is stationary and the rockshaft 16 is stationary and at a corresponding angular position, the error signals developed at the outputs of the comparator circuits 50 and 60 have substantially zero values, i.e. values equal or very nearly equal to predetermined reference potential which may be either a ground potential or a potential at a fixed point common to all comparators. When under such conditions, the control lever 57 is rotated through a substantial angle to a different angular position, an error signal is developed at the output of the first comparator circuit 50 which is applied through the amplifier circuit 58 and through line 59 to one input of the second comparator circuit 60 which then develops an error signal detected by the error detector circuit 78. At the same time, the error detector circuit 86 responds to the error signal developed by the first comparator circuit 50 to apply a signal through line 85 to the gating circuit 77 and to cause the output lines 79 and 80 from the error detector circuit 78 to be connected to lines 83 and 84 and thus to the solenoids 41 and 42.

One or the other of the solenoids 41 and 42 is then energized depending upon the polarity of the signal applied from the comparator circuit 60 through line 81 to the error detector circuit 78. If, for example, the solenoid 41 is energized, fluid may flow from the supply line 39 through the control valve 38 and line 36 to the pilot cylinder 34 to move the spool of the spool valve 28 in a direction to so control flow as to allow the hitch assembly 11 to lower.

During such operation, a feedback signal is applied from the potentiometer contact 66 through line 65 and through the signal modifying circuit 64, amplifier circuit 62 and line 61 to the comparator circuit 60 in opposition to the error signal applied through line 59 to the other input of the comparator circuit 60. As the angular position of the rockshaft 16 approaches a target position corresponding to the angular position of the control lever 57, the magnitude of the error signal applied through line 59 decreases and before the final target position is reached, the polarity of the error signal developed at the output of the comparator circuit 60 and applied through line 81 to the error detector circuit 78 reverses to cause a signal to be applied through line 80, gating circuit 77 and line 84 to the solenoid 42. As a result, the spool member of the spool valve 28 is moved in the reverse direction to cut off flow to the main cylinder 22.

When the spool member is so moved to cut off flow to the main cylinder 22, the rockshaft is at its target angular position and the error signal developed at the output of the first comparator circuit 50 as well as the corresponding signal from the output of the amplifier circuit 58 are of substantially zero magnitudes. Also, the feedback signal applied through line 61 to the other input of the second comparator circuit 60 is of substantially zero magnitude, so that no error signal is detected by the error detector circuit 78 and both the solenoids 41 and 42 are deenergized. It is noted, in this connection that the signal modifying circuit 64 has characteristics which are correlated to the characteristics of the spool valve 28. Spool valve 28 has what may be referred to as a "dead zone" in which a certain movement of the spool member away from a centered or neutral position is required before there will be flow in either direction. The signal modifying circuit 64 is arranged to develop a feedback signal at its output only when the spool member is moved in either direction beyond the limits of the dead zone. It is, however, desirable that the spool member be moved to a centered or neutral position following a positioning operation, and the error detector circuit 74 functions for this purpose. When the rockshaft reaches a target angular position and the error signal at the output of the comparator circuit 50 is reduced to substantially zero magnitude, the error detector circuit 86 applies a signal through line 85 to the gating circuit 77 at a level such that the gating circuit disconnects the lines 83 and 84 from the output lines 79 and 80 as the error detector circuit 78 and connects the lines 83 and 84 to the output lines 75 and 76 of the error detector circuit 74. The input of the error detector circuit 74 is connected directly through the line 65 to the potentiometer contact 66 and one or the other of the solenoids 41 or 42 is energized to move the piston of the pilot cylinder 74 and thereby the spool member of the spool valve 28 to a centered or neutral position.

To obtain optimum operation in which the rockshaft 16 is rotated to a new target angular position without overshooting and oscillation, it is found to be very important to use the proper relationship of signal amplification factors with respect to the error and feedback signals and also that the error detector circuits be operated at the proper levels of amplification, related to the characteristics of the main cylinder 22 and the load thereon, and the characteristics of the main and pilot valves and pilot cylinder. The relationship between signal amplification factors and operational levels, as well as the manner of operation of the system, will be more clearly understood from consideration of FIG. 2 in which the characteristics and operations of the various circuits and components are depicted diagrammatically.

Figure 2:
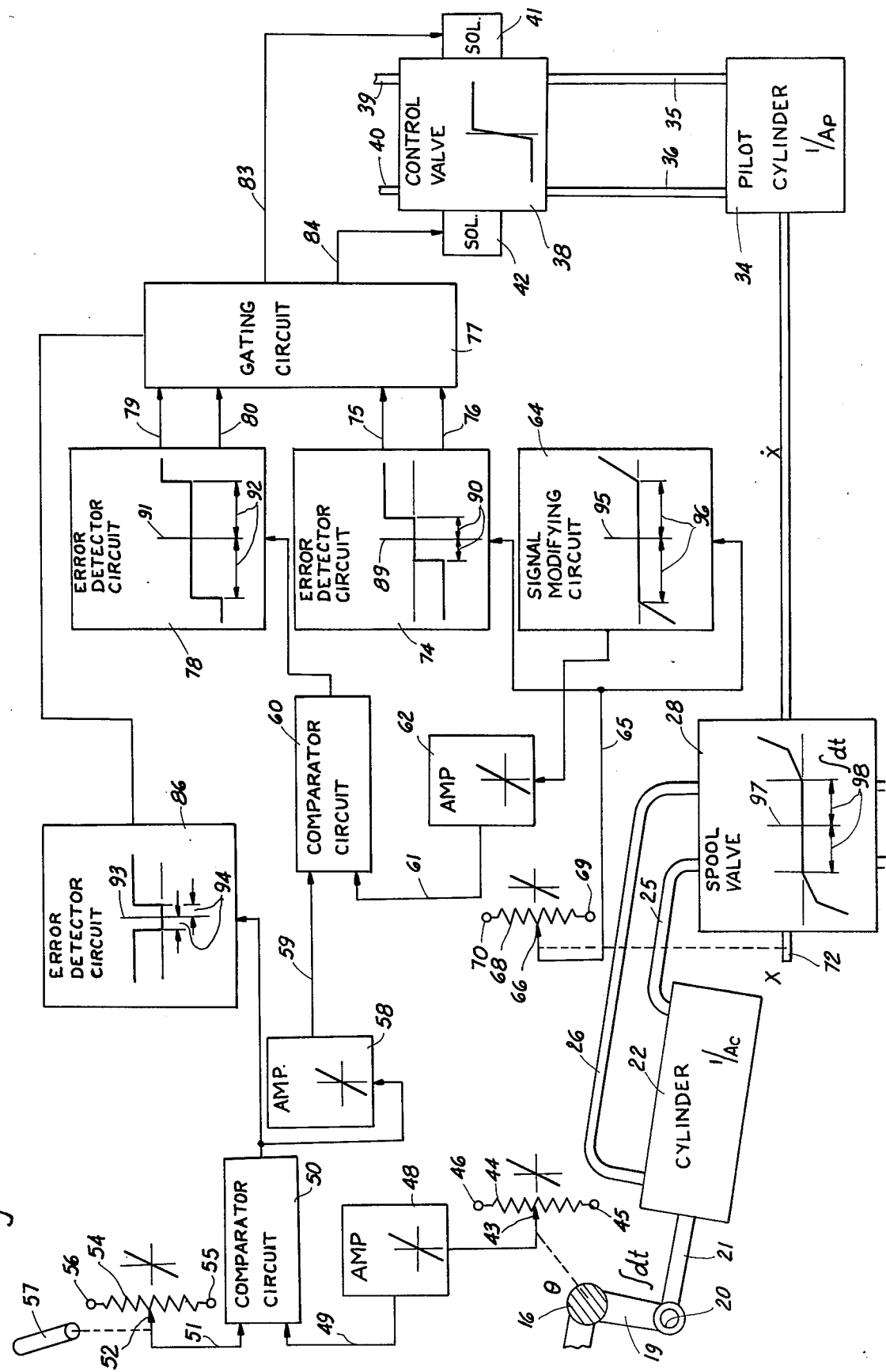
FIG. 2 is a schematic diagram similar to FIG. 1 but also showing diagrammatically and graphically the characteristics of the various electrical circuits and hydraulic and mechanical components of the system, for facilitating a better understanding of the operation thereof.

Referring to FIG. 2, the error detector circuits 74, 78 and 86 have characteristics as diagrammatically illustrated. The error detector circuit 74 is arranged to develop an output signal on line 75 when the level of the input signal on line 65 changes in a positive direction from a reference level indicated by the vertical line 89 through a voltage difference or threshhold value indicated by reference numeral 90. Similarly, an output signal is developed on line 76 when the level of the input signal on line 65 changes in a negative direction from the reference value 89 by the voltage difference or threshhold value 90. The error detector 78 operates in a similar manner, the reference potential being indicated by reference numeral 91 and the threshhold value being indicated by reference numeral 92. In the case of the detector circuit 86, the reference potential is indicated by reference numeral 93 while the threshhold value is indicated by reference numeral 94. This circuit, however, develops an output signal on line 85 having a first value or level when the difference between the level of the input voltage and the reference potential 93 is less than the threshhold value 94 and develops an output signal on line 85 having a second value or level when the difference between the level of the input voltage and the reference potential 93 is greater than the threshhold value 94. When the difference is less than the threshhold value 94, the gating circuit 77 connects the output lines 75 and 76 of the error detector circuit 74 to the solenoid lines 83 and 84 while when the difference is greater than the threshhold value 94, the gating circuit 77 is controlled to connect the output lines 79 and 80 of the error detector circuit 78 to the solenoid lines 83 and 84.

The signal modifying circuit 64 has characteristics as depicted developing no output signal when the difference between the level of an input signal applied on line 65 and a reference potential 95 is less than a threshhold value 96 but having linear response characteristics with respect to differences in levels greater than the threshhold value 96.

The transducers or potentiometers 44, 54 and 68 and the amplifier circuits 48, 58 and 62 preferably have linear response characteristics as illustrated.

The flow characteristics of the pilot or control valve 38 are illustrated diagrammatically, the ordinate in this case being flow and the abscissa being the effective signal applied to the raise and lower solenoids 41 and 42. The flow is at a uniform rate or velocity in one direction when the solenoid 41 is energized and at the same uniform rate or velocity in the opposite direction when the solenoid 42 is energized. The pilot cylinder converts such uniform flow rates into a corresponding velocity of movement of the piston thereof and hence the spool of the spool valve member, such velocty being indicated by x, the velocity x being inversely proportional to the area $A_p$ of the piston.

The velocity x is in effect integrated, the movement of the spool valve member, indicated by x, corresponding to time integration of the velocity x.

The spool valve has characteristics as graphically illustrated, the abscissa being the movement of the spool valve member with respect to a centered or neutral position 97 and the ordinate being the rate or velocity of flow through the valve. It is noted that there is no flow within a dead zone, when the movement in either direction away from the centered position 97 is less than a threshhold value 98. When the movement in either direction is greater than the threshhold value 98, flow increases linearly, first with a relatively lower factor of proportionality and then with a higher factor of proportionality.

The main cylinder 22 converts the flow from the spool valve 28 into a angular velocity of the rockshaft 16, indicated by $\theta$ and such angular velocity is time integrated to produce angular movement indicated by $\theta$.

For optimum operation, the threshold value 96 for the signal modifying circuit 64 should preferably correspond to the threshold value 98, determined by the dead zone of the spool valve 28. The amplification factor of the amplifier circuit 58, the amplification factor of the amplifier circuit 62 and the threshhold value 92 for the error detector circuit 78 are interrelated with each other and are also related to the flow rates through the pilot or control valve 38 and the spool valve 28 and the areas of the pilot cylinder 34 and main cylinder 22. In general, if the amplification factor of the amplifier circuit 62, i.e. the amplification of the feedback signal, is too low in relation to the amplification factor of the amplifier circuit 58, i.e. the amplification of the main error signal, the system may operate to move the rockshaft 16 beyond the target angular position, i.e. overshoot, necessitating a reverse operation to reach the target angular position. On the other hand, if the amplification of the feedback signal is too high in relation to the amplification of the main error signal, flow to the main cylinder 22 may be cut off before reaching the target angular position, i.e. there may be an under-shoot operation, necessitating one or more repeated operations to reach the target angular position. If the threshold value of the error detector circuit 78 is too low in relation to the amplification of the feedback and main error signals, the likelihood of such over-shoot and under-shoot operations is increased and may not be avoided under a normal range of operating conditions. If, on the other hand, the threshold value of the error detector circuit 78 is too high in relationto the amplification of the feedback and main error signals, accurate positioning of the rockshaft 16 will not be reliably obtained.

It is noted that the amplification factors may in some cases be less than unity and the amplifier circuit such as circuits 48, 58 and 62 need not in all cases produce a voltage gain but may simply be in the form of a resistance voltage divider network.

The threshold value for the error detector circuit 74 should be substantially less than that of the error detector circuit 78, since it is operative only for centering of the spool valve when the system is otherwise balanced but it should be high enough to avoid oscillatory or hunting action.

The threshold value for theerror detector circuit 86 is related to the other values and to the limits set as to the accuracy of positioning of the rockshaft 16. If the threshold value of the detector circuit 86 is too low, the pilot and main valves may be unnecessarily brought into operation to perform adjustment operations even though the position is within reasonable limits and, also, proper centering operation through the operation of the detector circuit 74 may be precluded. If it is too high, the desired accuracy of operation will not be obtained.

It is noted that the illustrated system operates to respond to the position of the rockshaft 16, but could be operative to respond to other operational variables instead of or in addition to responding to rockshaft position. For example, means may be provided for responding to the draft or pulling force applied through the hitch assembly to an implement connected thereto.

It will be understood that other modifications and variations may be effected without departing from the spirit and scope of the novel concepts of the invention.

We claim as our invention:

1. A control system for a hydraulically operated tractor hitch assembly which includes a main cylinder for controlling hitch raising and lowering movements, a main valve including a control element, said main valve having a dead zone in a neutral position requiring movement of said control element thereof away from a neutral position to effect flow in either direction, for controlling fluid flow to said main cylinder, a pilot cylinder for operating said main valve control element, and electrically operated pilot valve means for controlling fluid flow to said pilot cylinder, said control system comprising:

means for supplying a command signal having a magnitude corresponding to a target condition of said hitch assembly;

first feedback means for developing a first feedback signal corresponding to an actual operational condition of said hitch assembly;

second feedback means for developing a second feedback signal in response to movements of said main valve control element in either direction beyond said dead zone;

comparative circuit means responsive to said command signal and said first and second signals to develop an output signal such that in response to a difference between said command and first feedback signals flow to said main cylinder is cut off through actuation of said main control valve after said hitch assembly is moved to within a narrow target condition range, selected to optimize accuracy and minimize oscillation, corresponding to said new target condition and before said hitch assembly is moved beyond said narrow target condition range; and detector means being operative in response to balancing of said command and first feedback signals for controlling said pilot valve means from said second feedback signal to move said main valve control element to said neutral position thereof and said detector means including a first detector circuit responsive to said command and first and second feedback signals, a second detector circuit responsive to said second feedback signal, gating means for selective control of said electrically operated pilot valve means from said first detector circuit or said second detector circuit, and a third detector circuit responsive to a predetermined unbalance of said command and first feedback signals to control said gating means to operate said electrically operated pilot valve means from said first detector circuit and responsive to balancing of said command and first feedback signals to control said gating means to operate said pilot valve means from said second detector circuit, said detector means responsive to said comparator circuit circuit means output signal and arranged to control said electrically operated pilot valve means for controlling positioning of said main valve control element and movement of said hitch assembly to produce said target condition, said main valve control element being initially moved in a direction corresponding to a direction of change in said command signal which signals a new target condition, and said second feedback signal being applied in a direction to cause movement of said main valve control element in a reverse direction, said detector means in association with said electrically operated pilot valve means being operative to provide threshold values of operation such that a predetermined difference in each direction between the amplitude of said output signal and a reference potential at a fixed level relative to ground is required for operation of said pilot valve in a corresponding direction to initiate flow to said pilot cylinder.

2. In a system as defined in claim 1, said second feedback means comprising transducer means arranged to develop an output signal varying as a generally linear function of movement of said main valve control element, and signal modifying means responsive to said transducer means output signal to develop an output signal varying as a function of movement of said control element beyond said dead zone, and means for applying said output signal of said signal modifying means to said detector means.

3. In a system as defined in claim 1, said comparator circuit means, comprising a first comparator circuit responsive to said command and first feedback signals to develop a first error signal, and a second comparator circuit responsive to said first error signal and second feedback signal to develop a second error signal forming said output signal of said comparator circuit means.

4. In a system as defined in claim 1, said detector means including a first detector circuit responsive to said second error signal, a second detector circuit responsive to said second feedback signal, gating means for selective control of said pilot valve means from said first detector circuit or said second detector circuit, and a third detector circuit responsive to said first error signal to control said gating means to operate said pilot valve means from said first detector circuit when said first error signal has a magnitude greater than a threshold value corresponding to said narrow target condition range of said hitch assembly and operative to control said gating means to operate said pilot valve means from said second detector circuit when said first error signal has a magnitude less than said threshold value.

5. In a system as defined in claim 4, second feedback means comprising transducer means arranged to develop an output signal varying as a generally linear function of movement of said main valve control element, signal modifying means responsive to said transducer means output signal to develop an output signal varying as a function of movement of said control element beyond a dead zone, means applying said output signal of said signal modifying means to said second comparator, and means applying said output signal of said transducer means to said second detector circuit.

* * * * *